US010634047B2

(12) United States Patent
Su (10) Patent No.: US 10,634,047 B2
(45) Date of Patent: Apr. 28, 2020

(54) MULTIPLE AXLE-SLEEVE DRIVING BIDIRECTIONAL ROTATING WHEEL-SHAPED FAN TURBINE AND A BUSHING WHEEL-SHAPED FAN COMPRESSOR

(71) Applicant: Li Su, Beijing (CN)

(72) Inventor: Li Su, Beijing (CN)

(*) Notice: Subject to any disclaimer, the term of this patent is extended or adjusted under 35 U.S.C. 154(b) by 294 days.

(21) Appl. No.: 15/849,640

(22) Filed: Dec. 20, 2017

(65) Prior Publication Data
US 2018/0142619 A1 May 24, 2018

Related U.S. Application Data

(63) Continuation of application No. PCT/CN2015/000635, filed on Sep. 9, 2015.

(51) Int. Cl.
*F02C 3/067* (2006.01)
*F04D 25/02* (2006.01)
(Continued)

(52) U.S. Cl.
CPC ............... *F02C 3/067* (2013.01); *F01D 1/20* (2013.01); *F01D 1/26* (2013.01); *F01D 5/02* (2013.01);
(Continued)

(58) Field of Classification Search
CPC .... F02C 3/06; F02C 3/67; F02C 3/073; F02C 7/20; F02C 7/36; F01D 5/06; F01D 1/20;
(Continued)

(56) References Cited

U.S. PATENT DOCUMENTS 3,385,509 A * 5/1968 Garnier ................. F01D 17/167
415/66
3,524,318 A * 8/1970 Bouiller ................... F01D 5/03
60/226.1
(Continued)

FOREIGN PATENT DOCUMENTS

CN 1487180 A 7/2002
CN 103562518 A 5/2011
(Continued)

*Primary Examiner* — Scott J Walthour
*Assistant Examiner* — David P. Olynick
(74) *Attorney, Agent, or Firm* — Wayne & Ken, LLC; Tony Hom (57) ABSTRACT

A multiple axle-sleeve driving bidirectional rotating wheel-shaped fan turbine and a bushing wheel-shaped fan compressor, including: a working component, a driving component, a structural and installed component and a starting component. A wheel-shaped fan of the turbine drives a corresponding wheel-shaped fan of compressor to rotate through a driving axle sleeve. A rotating direction of the wheel-shaped fan of the turbine is opposite to a rotating direction of a wheel-shaped fan adjacent to the wheel-fan and rotating speed of the plurality of wheel-shaped fan is different. Each of the auxiliary wheel-shape fans is respectively bushed on each of the wheel-shaped fans of the compressor. A turbojet assembled with this disclosure has a high functionality, a light weight, a quick heat dissipation, an excellent anti-surging and a low energy consumption.

5 Claims, 6 Drawing Sheets

(51) Int. Cl.
*F04D 29/32* (2006.01)
*F01D 1/20* (2006.01)
*F01D 1/26* (2006.01)
*F01D 5/02* (2006.01)
*F01D 5/14* (2006.01)
*F01D 5/18* (2006.01)
*F02C 7/268* (2006.01)
*F02C 7/36* (2006.01)
*F04D 19/00* (2006.01)
*F04D 29/056* (2006.01)
*F04D 29/54* (2006.01)

(52) U.S. Cl.
CPC .............. *F01D 5/141* (2013.01); *F01D 5/18* (2013.01); *F02C 7/268* (2013.01); *F02C 7/36* (2013.01); *F04D 19/005* (2013.01); *F04D 25/024* (2013.01); *F04D 29/056* (2013.01); *F04D 29/321* (2013.01); *F04D 29/325* (2013.01); *F04D 29/541* (2013.01); *F05D 2260/31* (2013.01); *Y02T 50/671* (2013.01)

(58) Field of Classification Search
CPC ... F01D 1/24; F01D 1/26; F01D 5/026; F01D 5/081; F01D 5/085; F01D 5/088; F01D 1/22; F01D 1/28
See application file for complete search history.

(56) References Cited

U.S. PATENT DOCUMENTS

| | | | | |
|---|---|---|---|---|
| 3,937,592 | A | * | 2/1976 | Bammert ................ F01D 5/142 415/194 |
| 4,159,624 | A | * | 7/1979 | Gruner .................... F02C 3/107 60/268 |
| 5,493,855 | A | * | 2/1996 | Walters .................. F01D 5/187 415/173.1 |
| 9,534,608 | B2 | * | 1/2017 | Gehlot .................. F04D 19/024 |
| 2015/0240836 | A1 | * | 8/2015 | Guemmer ............ F04D 29/324 416/200 A |

FOREIGN PATENT DOCUMENTS

| | | |
|---|---|---|
| DE | 102008031986 A1 | 7/2008 |
| WO | 2008026788 A1 | 8/2006 |

* cited by examiner

FIG. 6

MULTIPLE AXLE-SLEEVE DRIVING BIDIRECTIONAL ROTATING WHEEL-SHAPED FAN TURBINE AND A BUSHING WHEEL-SHAPED FAN COMPRESSOR

TECHNICAL FIELD

The present disclosure relates to a technology field of turbine and compressor of turbojet, and specifically to a multiple axle-sleeve driving bidirectional rotating wheel-shaped fan turbine and a bushing wheel-shaped fan compressor.

BACKGROUND

An existed working mode of a turbine and a compressor of a turbojet engine (a core engine) is as follows. Multi-stage fans of the compressor rotate in order to compress air concentrated from 10 times to more than 20 times and convey the air to the combustor and mix the air with a fuel. The mixed gas is ignited in the combustor and is exploded out from the rear of the engine and in the meanwhile drives to rotate the multi-stage fans of the turbine. Multi-stage fans of the turbine provide power for multi-stage fans of the compressor through a single or a plurality of driving shafts (double shafts or triple shafts), so that the turbojet works. In general, if more air is compressed and conveyed by the compressor of the turbojet engine, a compression ratio is higher, a thrust of the turbojet engine is greater, a thrust-weight ratio is higher, an efficiency is higher, and more energy consumption is saved. However, there has been a few outstanding problems in the existing turbojet engine at present. Firstly, problems of fans: a fan blade of the fan is connected with the single shaft and multiple shafts in a cantilever structure. The fan blade is vulnerable to deform under a circumstance of wind pressure. In addition to an effect of thermal expansion on the fan blade, a certain space is allowed to ensure an avoidance of a friction and collision between working stages of the fans (axial direction) or between a fan tip and an inner duct (radial direction). However this certain space induces an escape of the compressed gas, reducing a working efficiency of the compressor. A stage of the fan of the compressor has to be increased in order to improve the compression ratio, thereby increasing a weight of the turbojet engine. Or, the fan blade is improved to have a wider chord, a thicker fan blade and a bigger root. In fact, the wide chord fan blade increase a working resistance as well as weight, thus becoming a burden during the air entering into the turbojet engine, and reducing a working efficiency and the thrust-weight ratio of the turbojet engine, when a velocity of a flying airplane is over the supersonic speed. Secondly, heat-resisting problem of the material. The fan at the last stage is too vulnerable to lose its strength and be melted or be corroded if the compression ratio reaches a certain degree. The increase of the compression ratio leads to a consequent increase of temperature of a mixed air, when the mixed gas is ignited in the combustor and exploded to the rear of the turbojet engine. Therefore, the compression ratio is restricted and thus the working efficiency is restricted. Thirdly, surging of the turbojet engine. Since the single driving shaft or multiple driving shafts drive the rotation of the multiple stage of fans, a last stage fan is stalled induced by a stalling of a first stage fan due to a resistance of air inflow, so that the turbojet engine works disorderly or even stops working.

SUMMARY

In order to improve the working efficiency of the turbojet engine (the core engine), and minimize the problems restricting the efficiency which are mentioned above, the present disclosure discloses a multiple axle-sleeve driving bidirectional rotating wheel-shaped fan turbine and a bushing wheel-shaped fan compressor. It includes a working component, a driving component, a structural and installed component and a starting component.

Wherein, the working component comprises a plurality of wheel-shaped fans, and the wheel-shaped fans are formed by an internal tapered ring, an external tapered ring and a plurality of fan blades for connecting the internal tapered ring and the external tapered ring.

The wheel-shaped fans are divided into a plurality of wheel-shaped fans of the compressor and a plurality of wheel-shaped fans of the turbine. And the wheel-shaped fans of the compressor consist of a plurality of main wheel-shaped fans (indicated as 11, 12, 13, 14, 15, 16, 17, 18, 19 in FIG. 1) and a plurality of auxiliary wheel-shaped fans (indicated as 22, 23, 24, 25, 26, 27, 28, 29 in FIG. 1) bushed on the main wheel-shaped fans.

A front part of a first main wheel-shaped fan of the compressor (indicated as 11 in FIG. 1) is exposed outside and there is no auxiliary wheel-shaped fan bushed on the first main wheel-shaped fan of the compressor.

The first main wheel-shaped fan of the compressor (indicated as 11 in FIG. 1) is butted with a first supporting disk of the compressor (indicated as 50 in FIG. 1) by a butting ring, and the butting ring is connected with the first wheel-shaped fan of the compressor by a bolt. The bolt together with the butting ring is a joint component indicated as 10 in FIG. 1.

Figure 2:
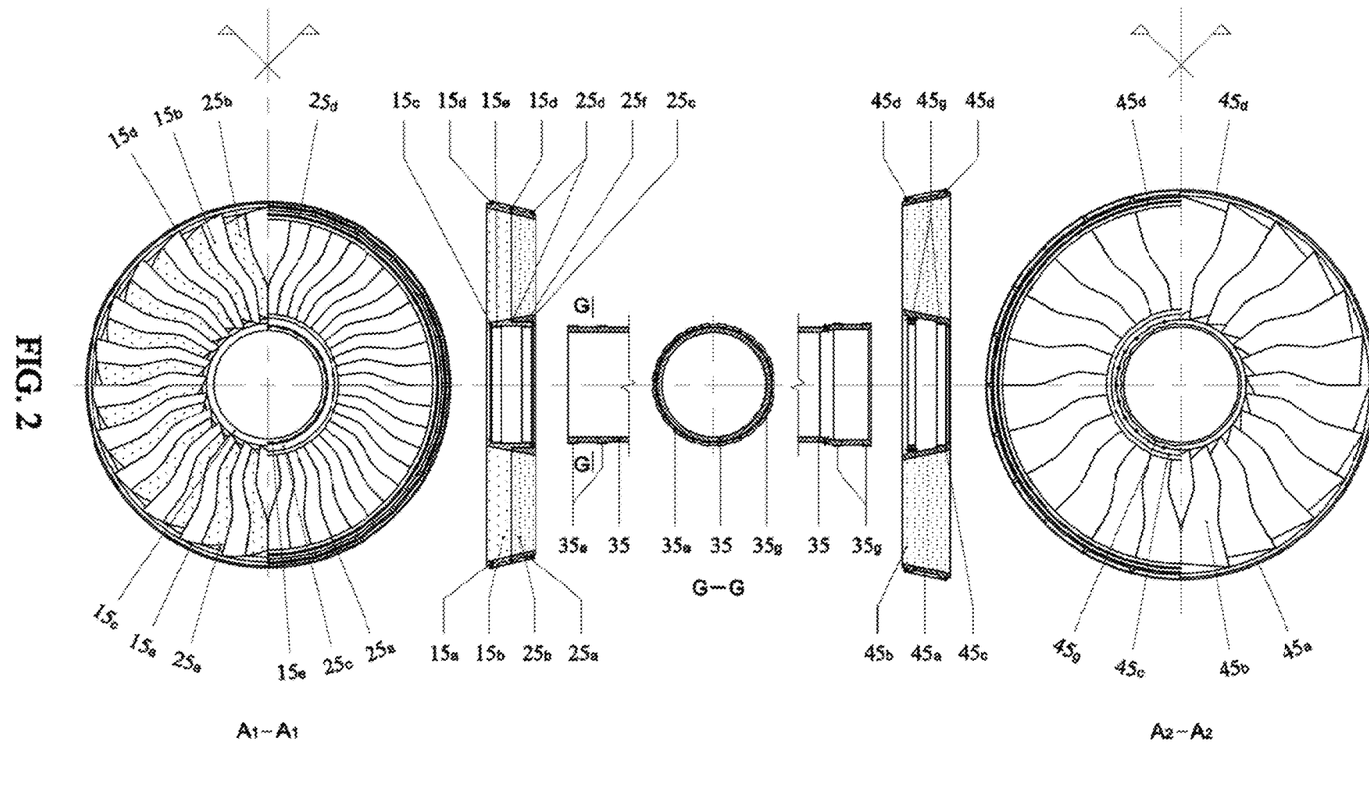
FIG. 2 shows a structural schematic diagram of a group of the working and driving components (indicated as 15, 25, 35, 45) of the multiple axle-sleeve driving bidirectional rotating wheel-shaped fan turbine and a bushing wheel-shaped fan compressor in the present disclosure.

A fan blade of each of the wheel-shaped fans of the turbine (indicated as 49, 48, 47, 46, 45, 44, 43, 42, 41 in FIG. 1) is hollow and holes are provided on a connecting part of the fan blade through and a rim and also on a connecting part of the fan blade and a wheel hub, forming an air flow channel through the rim, the hollow part of the fan blade and the wheel hub of the turbine;

The rim (indicated as Xa in FIG. 2, for example, 15*a*, 25*a* and 45*a*, indicating respectively the wheel-shaped fan of the compressor No. 15, the wheel-shaped fan of the compressor No. 25 and the wheel-shaped fan of the turbine No. 45) is an external conical ring of each of the wheel-shaped fans of the compressor and the wheel-shaped fans of the turbine.

Wherein round ball bearings as well as a slide way (indicated as Xd in FIG. 2, for example, 15*d*, 25*d* and 45*d*) are provided in a circle respectively at two lateral sides of an external circle of the rim.

The wheel hub (indicated as Xc in FIG. 2, for example, 15*c*, 25*c* and 45*c*) is an internal conical ring of each of the wheel-shaped fans of the compressor and the wheel-shaped fans of the turbine.

Wherein a plurality of driving key grooves or driving keys (indicated as Xe in FIG. 2, for example, 15*e*) of the main wheel-shaped fans of the compressor are provided in a circle at an internal circle of the wheel hub.

A wheel hub of the auxiliary wheel-shaped fan is bushed on a wheel hub of corresponding main wheel-shaped fan, and swinging key grooves or swinging keys (indicated as Xf in FIG. 2, for example, 15*f* or 25*f*) of the auxiliary wheel-shaped fan of the compressor are provided in a circle at an internal circle of the wheel hub of the auxiliary wheel-shaped fan, and the auxiliary wheel-shaped fan of the compressor freely swings within a certain angle around the wheel hub of the main wheel-shaped fan.

A plurality of driving key grooves or driving keys (indicated as Xg in FIG. 2, for example, 45g) of the wheel-shaped fans of the turbine are provided in a circle on an internal circle of the wheel hub of the wheel-shaped fans of the turbine.

A starting gear ring (indicated as 19h in FIG. 1) is provided at an external side of the rim of a last wheel-shaped fan (indicated as 19 in FIG. 1) at the rear end of the compressor.

A rolling ratchet (indicated as 19k in FIG. 1, $A_3$-$A_3$) is provided as a unidirectional rotating ratchet structure at an internal side of the rim of a wheel-shaped fan at the rear end of the compressor.

The rim of each of the wheel-shaped fans coincides with a central axis of the corresponding wheel hub of each of the wheel-shaped fans.

A fan blade (indicated as Xb in FIG. 2, for example, 15b, 25b and 45b) is provided for connecting the rim of each of the wheel-shaped fans and the corresponding wheel hub of each of the wheel-shaped fans.

One end of the fan blade is provided perpendicular to a tangent line of a connecting point of an internal side the rim, and the other end of the fan blade is provided perpendicular to a tangent line of a connecting point of an external side the wheel hub.

The connecting point between the rim and the fan blade and the connecting point between the fan blade and the wheel hub are not on a same radical emitted from a center of the wheel-shaped fan. The fan blade has a "S" shape (indicated as 15b, 25b or 45b in FIG. 2, $A_1$-$A_1$ or $A_2$-$A_2$).

Figure 4:
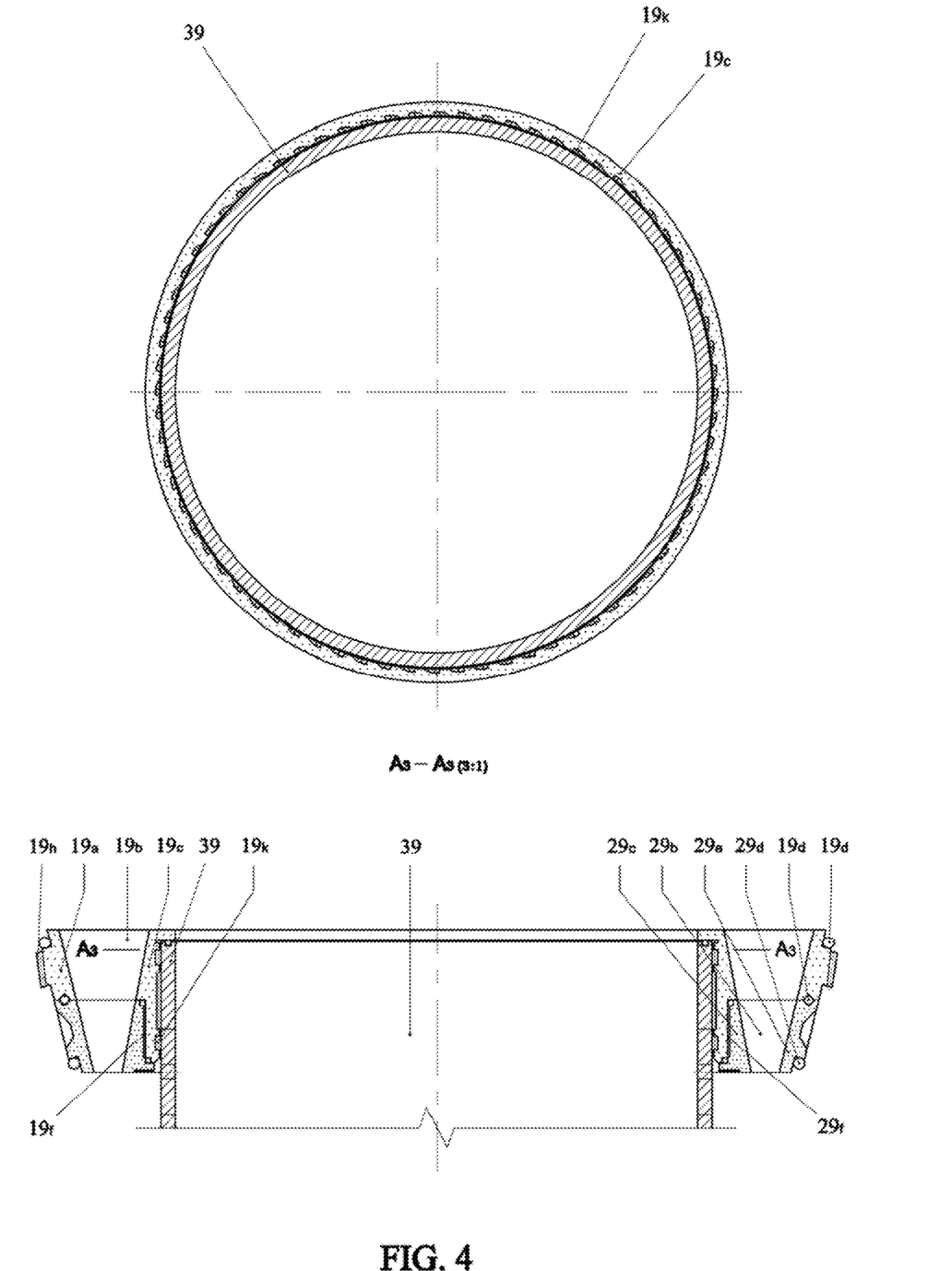
FIG. 4 shows a structural schematic diagram of the rolling ratchet of the wheel-shaped fan at the rear end (indicated as 19 in FIG. 1) of the compressor of the multiple axle-sleeve driving bidirectional rotating wheel-shaped fan turbine and a bushing wheel-shaped fan compressor in the present disclosure.

Beneficial effects of the wheel-shaped fan of the working component in present disclosure are as follows compared to the prior art. Firstly, the structure of the wheel-shaped fan improves a fixing mode of the fan blade. An existing unilateral and fixed connection between a fan blade and a driving axle with a cantilevered force structure, is replace by a bilateral and fixed connection of the fan blade and the rim as well as the fan blade and the wheel hub. An anti-bending moment of inertia of the fan blade improves multiple times. Deformation by force greatly reduces, which may induce a reduction on the thickness of the fan blade and on a weight of a root structure. Additionally, working resistance is also deceased and air leakage is reduced by decreasing an axis space between the wheel-shaped fans to reduce leakage (and a small amount of leakage forms a film to reduce a rotation friction between the wheel-shaped fans). Additionally, no air leakage exists between the tip of the wheel-shaped fan and the outer duct in an integrated body of the rim, the wheel hub and the fan blade. Thus, the fan blade is not only a working component but also a supporting and connection component for the rim and the wheel hub, forming a penetrating-through compressor and turbine with no air leakage in a radical direction and no resistance in an axial direction. The working efficiency is thus significantly improved. Secondly, the front part of the first wheel-shaped fan of the compressor (indicated as 11 in FIG. 1) is exposed outside (FIG. 1, at point of B) in order to provide convenience for further setting an external fan or wind slurry on it. Thirdly, a starting gear ring and a rolling ratchet (indicated as 19h and 19k in FIG. 4, $A_3$-$A_3$) are provided on the external side of the rim of the wheel at the rear end of the compressor in order to facilitate the starting of the engine. Fourthly, the fan blade is made in "S" shape (indicated as 15b, 25b and 45b in FIG. 2, $A_3$-$A_3$). When the fan blade is heated, since the rim and the wheel hub impose a ring on the fan blade, the amount of thermal expansion is transferred to a S-bend deformation, thereby reducing the deformation of the rims and the wheel hub and ensuring a normal operation of its wheel-shaped fan. Fifthly, the hollow fan blade is designed as the wheel-shaped fan of the turbine and forms an air circulation channel. During the operation of the engine, the cold air flowing therein takes away the heat of the fan blade and enables the wheel-shaped fan of the turbine to withstand a higher temperature, thereby enhancing a compression ratio of the compressor, and improving the working efficiency of the engine.

Figure 1:
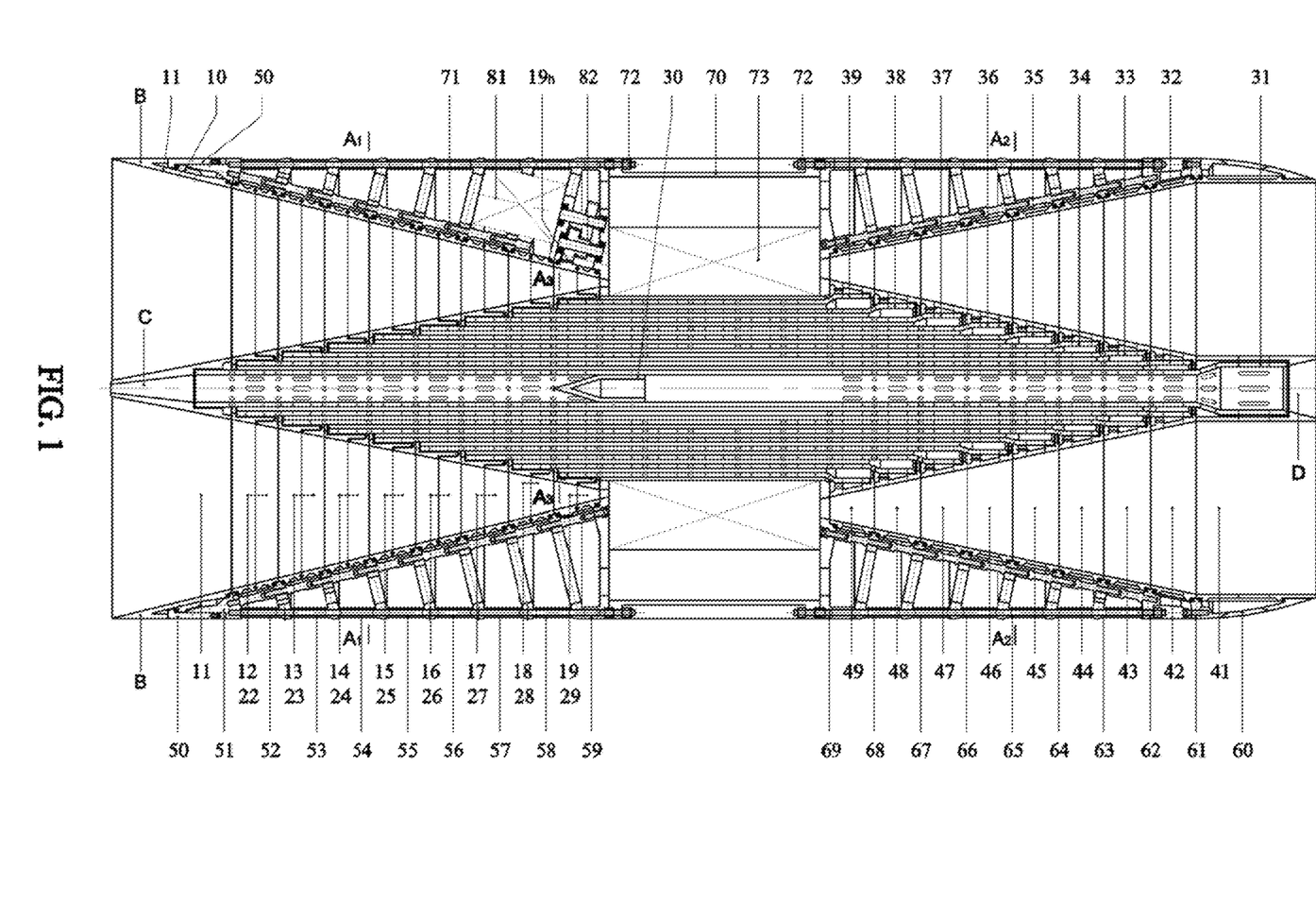
FIG. 1 shows an overall structural schematic diagram of the multiple axle-sleeve driving bidirectional rotating wheel-shaped fan turbine and a bushing wheel-shaped fan compressor in the present disclosure.

The driving component comprises a plurality of driving axle sleeves, wherein each of the wheel-shaped fans of the turbine drives a corresponding wheel-shaped fan of the compressor to rotate, and each of the driving axle sleeves is provided between the wheel-shaped fan of the turbine and the wheel-shaped fan of the compressor (the wheel-shaped fan of the turbine 45 is corresponding to the main wheel-shaped fan 15 and the auxiliary wheel-shaped fan 25 of the compressor, with the driving axle sleeve 35 connecting between the three, in FIG. 1).

The axle sleeves (indicated as 31, 32, 33, 34, 35, 36, 37, 38 and 39 in FIG. 1) are sleeved together around an axis, with space between each other.

A plurality of penetrating holes are provided on a wall of each of the axle sleeves.

A guiding cone (indicated as 30 in FIG. 1) is provided in a central driving axle sleeve to guide the flow.

A plurality of circular keys or key grooves (indicated as Xe in FIG. 2, for example 15e) of the wheel-shaped fans of the compressor is a plurality of circular keys or key grooves provided at one end (a smaller end) of the driving axle sleeve and are inserted into the wheel hubs of the main wheel-shaped fans of the compressor.

A plurality of driving keys or key groove rings (indicated as Xg in FIG. 2, for example 45g) of the wheel-shaped fans of the turbine is a plurality of circular keys or key grooves provided at the other end (a bigger end) of the driving sleeves and are able to inserted into the wheel hubs of the wheel-shaped fans of the turbine.

The rolling ratchet (indicated as Xk in FIG. 4, $A_3$-$A_3$, for example 19k) is provided at an end of the driving axle sleeve at the outermost (indicated as 39 in FIG. 1) connected to the wheel-shaped fan (indicated as 19 in FIG. 1) of the compressor, replacing the driving key groove rings or keys of the wheel-shaped fans of the compressor by a smooth surface and unidirectionally driving the wheel-shaped fan of the compressor.

Beneficial effects of the driving axle sleeve of the driving component in present disclosure are as follows compared to the prior art. Firstly, spaces are left between the axle sleeves so that no interactive effect exists during their rotation. Penetrating-through holes are provided on the wall of the axle sleeves. A guiding cone is provided in the central driving axle sleeve, guiding the air and dissipating heat. Secondly, the driving axle sleeves are respectively suspended on the wheel hubs of the wheel-shaped fans of the compressor and on the wheel hubs of the wheel-shaped fans of the turbine. The engine penetrates through axially, without any components for fixedly supporting the driving axle sleeves such as bearings and holders. Thus the working efficiency of the turbine and the compressor are enhanced.

The structural and installed component comprises a plurality of supporting disks, a plurality of disk-fixing bolts, a plurality of assembling bolt sets, a middle casing and a circular combustor.

Wherein each of the supporting disks is a round shaped disk component where a plurality of ball bearings and a slide way support each of the wheel-shaped fans of the compressor and the turbine to rotate.

The supporting disks comprise a plurality of supporting disks (indicated as 61, 62, 63, 64, 65, 66, 67, 68 and 69 in FIG. 1) of the wheel-shaped fan of the turbine and a plurality of supporting disks (indicated as 50, 51, 52, 53, 54, 55, 56, 57, 58 and 59 in FIG. 1) of the wheel-shaped fans of the compressor.

Figure 3:
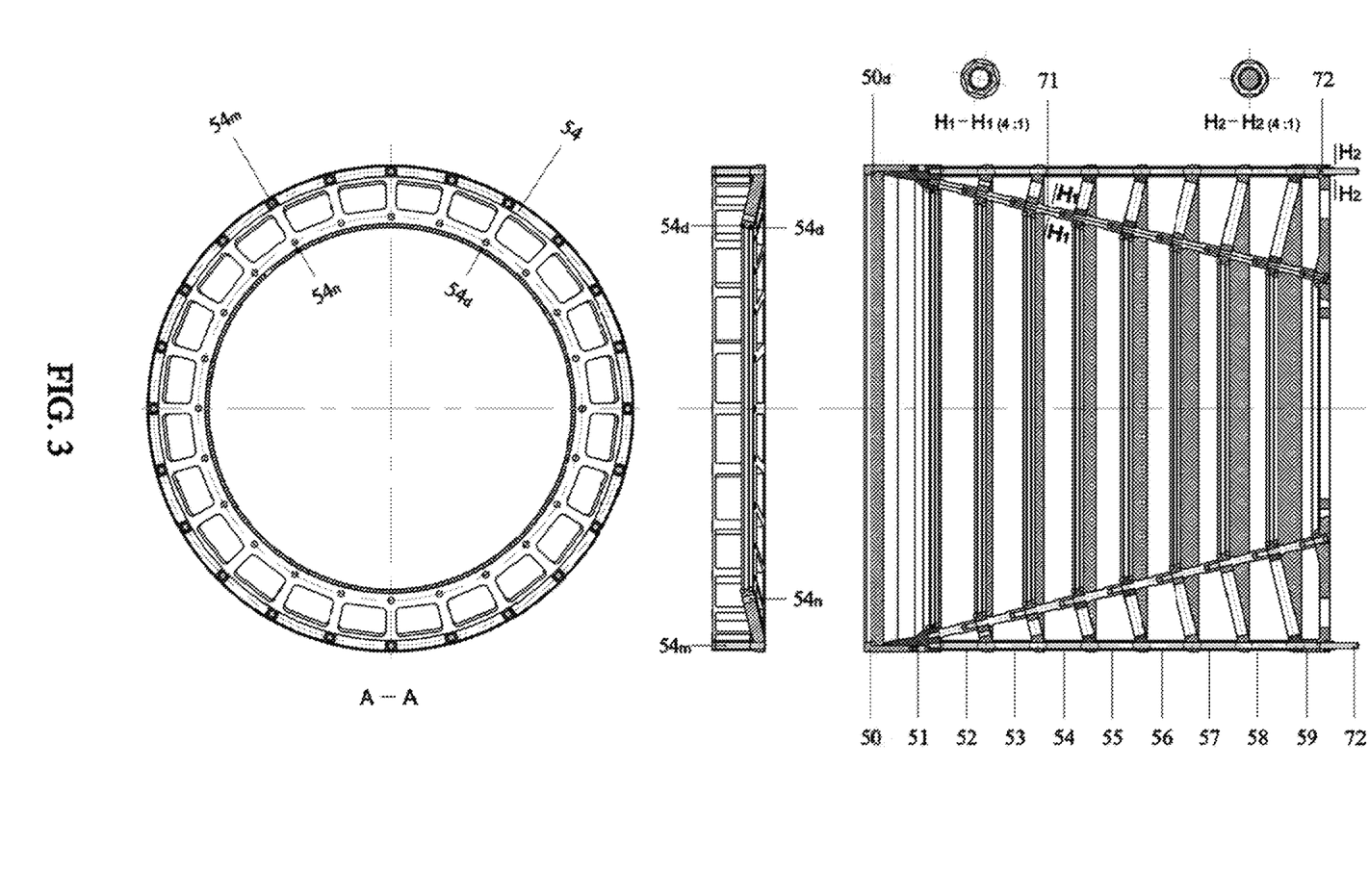
FIG. 3 shows a structural schematic diagram of a section of the structural and installed components (indicated as 50-59 in FIG. 1) of the multiple axle-sleeve driving bidirectional rotating wheel-shaped fan turbine and a bushing wheel-shaped fan compressor in the present disclosure.

Wherein, the ball bearings and the slide way (indicated as Xd in FIG. 3, for example 54d) are provided at one side or two sides of an internal circle of each of the supporting disks.

A plurality of disk-fixing holes (indicated as Xn in FIG. 3, for example 54n) is provided as a plurality of round penetrating holes in a circle in an internal side of each of the supporting disks.

The disk-fixing bolts (indicated as 71 in FIG. 1 and FIG. 3) are bolts fixing two adjacent supporting disks through the disk-fixing holes.

A plurality of assembling holes (indicated as Xm in FIG. 3, for example 54m) is provided as a plurality of penetrating holes in a circle at an external side of each of the supporting disks.

A plurality of assembling bolt sets (indicated as 72 in FIG. 1 and FIG. 3) are a bolt and a fastening component thereof penetrating the assembling holes and fixing together the wheel-shaped fans of the compressor, the supporting disks of the wheel-shaped fans of the turbine and the middle casing (indicated as 70 in FIG. 1).

The circular combustor (indicated as 73 in FIG. 1) is sleeved in the middle casing, and is connected to the supporting disk of the last wheel-shaped fan of the compressor or the supporting disk of the last wheel-shaped fan of the turbine.

The starting component and parts comprises a starting motor and a starting gear train.

Wherein the starting motor (indicated as 81 in FIG. 1) provides power for starting an engine.

The starting gear train (indicated as 82 in FIG. 1) transmits the power of the starting motor to the starting gear ring (indicated as 19h in FIG. 1) of the wheel-shaped fan at the rear end of the compressor.

Reference numerals for the components and parts mentioned above are shown as follows.
- 10: the butting ring and bolt of the first wheel-shaped fan (11) of the compressor;
- 11, 12, 13, 14, 15, 16, 17, 18, 19: the main wheel-shaped fans of the compressor;
- 22, 23, 24, 25, 26, 27, 28, 29: the auxiliary wheel-shaped fans sheathing on the main wheel-shaped fans of the compressor;
- 30: the guiding cone;
- 31, 32, 33, 34, 35, 36, 37, 38, 39: the driving axle sleeves;
- 41, 42, 43, 44, 45, 46, 47, 48, 49: the wheel-shaped fans of the turbine;
- 51, 52, 53, 54, 55, 56, 57, 58, 59: the supporting disks of the compressor;
- 61, 62, 63, 64, 65, 66, 67, 68, 69: the supporting disks of the turbine;
- 70: the middle casing;
- 71: the disk-fixing bolt;
- 72: the assembling bolt set;
- 73: the circular combustor;
- 81: the starting motor;
- 82: the starting gear train.

Additionally, reference numerals for functional components mentioned above are shown as follows. In general, the functional components are indicated as Xy, wherein X stands for a component, and y stands for a functional part of the component.
- a: the rim;
- b: the fan blade;
- c: the wheel hub;
- d: the ball bearing and the slide way;
- e: the driving keys or key grooves of the wheel-shaped fan of the compressor;
- f: the swinging keys or key grooves of the wheel-shaped fan of the compressor;
- g: the driving keys or key grooves of the wheel-shaped fan of the turbine;
- h: the starting gear ring;
- k: the rolling ratchet;
- m: the assembling holes;
- n: the fixing holes.

DETAILED DESCRIPTION

In order to illustrate clearly improvements of the technical solutions on the working and driving mode, the structure, the cooling mode as well as the starting mode, embodiments are given below in details. So that the above features and advantages of the present disclosure are readily understood.

In the multiple axle-sleeve driving bidirectional rotating wheel-shaped fan turbine and a bushing wheel-shaped fan compressor, one wheel-shaped fan of the turbine drives the corresponding wheel-shaped fan of the compressor to rotate by the corresponding driving axle sleeve.

The wheel-shaped fan of the turbine, the corresponding wheel-shaped fan of the compressor and the corresponding driving axle sleeve form a group. A rotating speed and a rotating direction within the group are the same. The rotating direction of the group is opposite to a rotating direction of an adjacent group. The rotating speed (absolute value) of the group is different to a rotating speed of the adjacent group. Except for the first wheel-shaped fan (indicated as 11 in FIG. 1) of the compressor and the last wheel-shaped fan (indicated as 41 in FIG. 1) of the turbine, two adjacent wheel-shaped fans of the compressor or the turbine with opposite rotating directions form a working stage. The auxiliary wheel-shaped fan of the compressor is bushed on the main wheel-shaped fan of the compressor. The main wheel-shaped fan of the compressor drives the auxiliary wheel-shaped fan of the compressor under the action of the swinging key grooves or swinging keys (indicated as Xf in FIG. 2, for example 15f or 25f). The main wheel-shaped fan of the compressor and the auxiliary wheel-shaped fan of the compressor unfold and form a wide chord fan blade. Or the main wheel-shaped fan of the compressor and the auxiliary wheel-shaped fan of the compressor form two narrow chord fan blades if the auxiliary wheel-shaped fan of the compressor hides behind the main wheel-shaped fan of the compressor.

Figure 5:
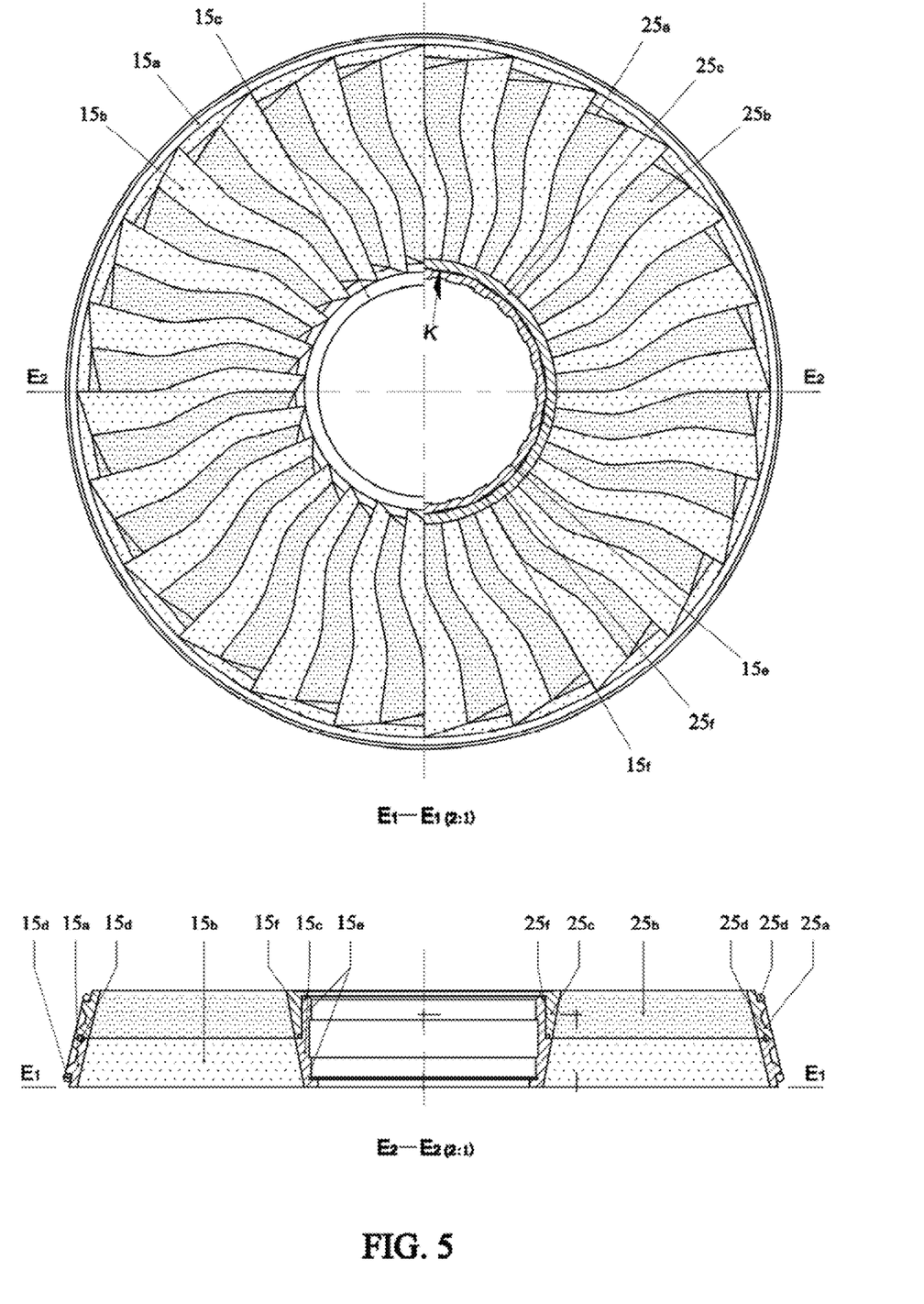
FIG. 5 shows a structural schematic diagram of some group of main wheel-shaped fan and auxiliary wheel-shaped fan (indicated as 15 and 25 in FIG. 1) of the compressor of the multiple axle-sleeve driving bidirectional rotating wheel-shaped fan turbine and a bushing wheel-shaped fan compressor in the present disclosure when the fan blade is unfolded.
Figure 6:
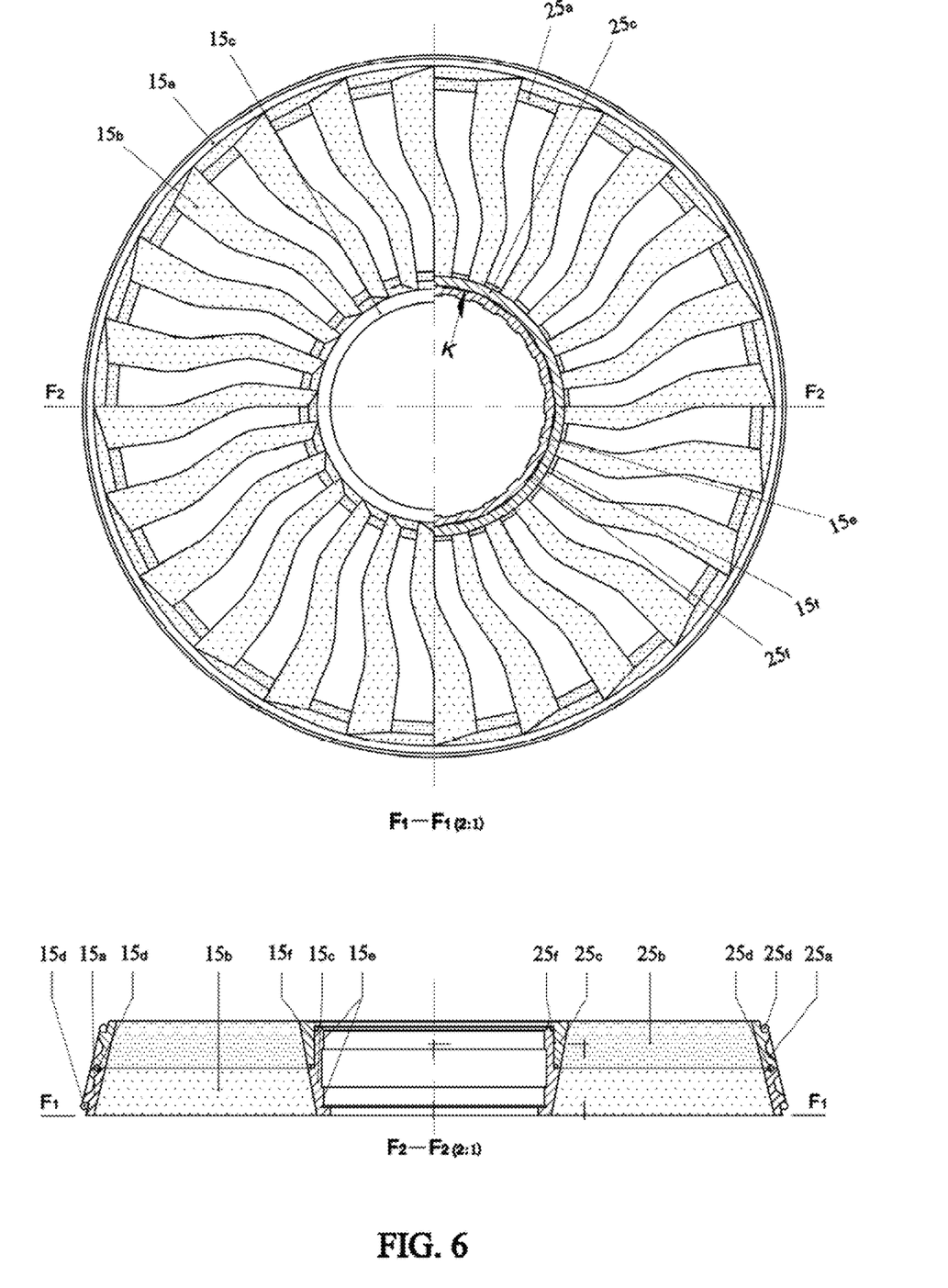
FIG. 6 shows a structural schematic diagram of some group of main wheel-shaped fan and auxiliary wheel-shaped fan (indicated as 15 and 25 in FIG. 1) of the compressor of the multiple axle-sleeve driving bidirectional rotating wheel-shaped fan turbine and a bushing wheel-shaped fan compressor in the present disclosure when the fan blade is folded.

Beneficial effects of the working and driving mode in present disclosure are as follows compared to the prior art. Firstly, two wheel-shaped fans of every working stage with bidirectional rotating (forward and opposite) has a relative rotation speed more than twice of each stage fan blades (a rotor fan blade and a stator fan blade) of the existing compressor of the engine. Thus the working efficiency is improved and a stage number decreases of wheel-shaped fan of the compressor and the turbine. Secondly, a positive torque counteracts a negative torque, which are formed by wheel-shaped fans with bidirectional rotation, imposing a small effect on the external framework and beneficial to enhancing the structure and reducing the weight. Thirdly, the rotating speed of the wheel-shaped fan is increased by increasing a number of the working stages, since the independency that one wheel-shaped fan of the turbine drives one wheel-shaped fan of the compressor through one driving axle sleeve. If some wheel-shaped fan stall due to a resistance of the air inflow, the other wheel-shape fans work normally, thereby avoiding occurrence of engine surge. Fourthly, when an airplane starts to fly or flies with a low speed, the working efficiency is enhanced when the main wheel-shaped fans drive the auxiliary wheel-shaped fans and the fan blades unfold to form a wide chord fan blade (FIG. 5, shown as $E_1$-$E_1$), compressing air to the circular combustor. And when the airplane flies with a high speed, air flows directly to the compressor so that the fan blades of the auxiliary wheel-shaped fans rotate hide behind the fan blades of the main wheel-shaped fans. Part of air flows directly to the circular combustor and a flight drag is reduced.

The structure of the multiple axle-sleeve driving bidirectional rotating wheel-shaped fan turbine and a bushing wheel-shaped fan compressor is as follows. An external casing of the circular combustor and the middle casing form a middle double-sleeve structure. A circular funnel shaped external framework with a lattice structure (shown in FIG. 3 or FIG. 1) of the compressor or the turbine comprises the supporting disks, the disk-fixing bolts and the assembling bolt sets. A plurality of groups of ball bearings in the slide way of the supporting disk supports all the wheel-shaped fans of the compressor and the turbine of the supporting disk to rotate around a same axis (a forward direction or a reverse direction) on the circular funnel shaped external framework comprised by the supporting disks. The rim of the wheel-shaped fan supports or draws the fan blade, and the fan blade supports or draws the wheel hub. The driving axle sleeve penetrates through a hollow area of the circular combustor and respectively inserts into the wheel hubs of the corresponding wheel-shaped fans of the compressor and the turbine, and is suspended by the corresponding wheel-shaped fans of the compressor and the turbine. A double-sleeved structure arranged in the middle is formed by an external casing of the circular combustor and the casing in the middle; a left end and a right end of the compressor and of the turbine and the double-sleeved structure are closed by the assembling bolt sets, forming an entire body of the engine.

Beneficial effects of the structure in present disclosure are as follows compared to the prior art. Firstly, a structure rigidity is excellent with a light weight, as the entire body of the engine comprises the middle double-sleeve structure and the external framework with a cell structure at two ends. This structure facilitates ventilation and heat dissipation of external body of the engine. Secondly, the driving axle sleeves only transmit torque and bear a small part of bending moment of gravity. The driving axle sleeves is made from thin material, and a plurality of axle sleeves sleeved together with space between each other. The driving sleeve is respectively suspended on the top of the wheel hub of the corresponding wheel-shaped fan of the compressor and the turbine. There is no impact between each other and no bearings or other components or parts are necessary. Ventilation and heat dissipation are excellent.

The cooling mode of the multiple axle-sleeve driving bidirectional rotating wheel-shaped fan turbine and a bushing wheel-shaped fan compressor is as follows. Cold air enters into the central driving axle sleeve (indicated as 31 in FIG. 1) and is divided by the guiding cone (indicated as 30 in FIG. 1). The divided air firstly cools the wheel hubs of the wheel-shaped fans of the compressor by passing through the space between each of the driving axle sleeve, then cools the casing in the circular combustor by passing through an area of the circular combustor, and finally converges into the rear end (indicated as area D in FIG. 1) of the central driving axle sleeve to be discharged though the holes on the walls of the driving axle sleeves.

Beneficial effects of the structure in present disclosure are as follows compared to the prior art. Firstly, the cool air flows through the rims of the wheel-shaped fans of the compressor, and the space between the driving axle sleeves, the central area of the circular combustor as well as the hollow fan blade of the wheel-shaped fan of the turbine with a high speed from outside to inside, from the front to the end to take away the heat, thereby increasing heat-resistant quality of the components and parts of the engine and creating favourable condition for increasing the compression ratio of the compressor and the working temperature of the turbine. Secondly, a high negative pressure area is formed at the rear end of the central driving axle sleeves since a wake flow of hot air ejected by the turbine is supersonic. This wake flow provides a free power to the cooling mode of the air flow. The structure is simple and the cooling effect is excellent.

The starting mode of the multiple axle-sleeve driving bidirectional rotating wheel-shaped fan turbine and a bushing wheel-shaped fan compressor is as follows. The starting motor (indicated as 81 in FIG. 1) and the starting gear set (indicated as 82 in FIG. 1) only drive the wheel-shaped fan at the rear end (indicated as 19 in FIG. 1) of the compressor to compress the air to the circular combustor (indicated as 73 in FIG. 1). Since the rolling ratchet (indicated as 19*k*, $A_3$-$A_3$ in FIG. 4) rotates unidirectionally, the corresponding axle sleeve and the corresponding wheel-shaped fan (indicated as 39 and 49 in FIG. 1) of the turbine is not moved, forming a resistance to an air flow. The engine is ignited and starts when air in the circular combustor accumulates.

Beneficial effects are as follows of the structure in present disclosure compared to the prior art. Firstly, energy consumption is small during the starting process. Secondly, the starting components and parts are simple.

The embodiments described above are only the description of preferred embodiments of the present invention, but not limitation of the scope of the present invention. Any changes or improvement made by people having ordinary skill in the art within spirit of the present invention shall be included in the protection scope of the present invention.

What is claimed is:
1. An engine comprising;
    a working component, a driving component, a structural component and a starting component,
    the working component comprising
        a compressor and
        a turbine;
            wherein the compressor includes a plurality of dual wheel-shaped-fans of the compressor and the turbine includes a plurality of single wheel-shaped fans of the turbine
            wherein each of the dual wheel-shaped fans of the compressor and each of the single wheel-shaped fans of the turbine are formed by an internal tapered ring, an external tapered ring and a plurality of fan blades connecting the internal tapered ring and the external tapered ring, wherein the external tapered ring is a rim and the internal tapered ring is a wheel hub;
            wherein each rim is coaxial with a central axis of a corresponding wheel hub and each rim is connected with the corresponding wheel hub by the plurality of fan blades;
            wherein a first end of each fan blade is connected to a radially inward side of the rim at a first connecting point and the first end is perpendicular to a first tangent line to the rim at the first connecting point and a second end of each fan blade is connected to radially outward side of the wheel hub at a second connecting point and the second end is perpendicular to a second tangent line to the wheel hub at the second connecting point;
            wherein the first connecting point and the second connecting point of each fan blade are not on a common ray drawn from a center of each dual wheel-shaped fan of the compressor and each single wheel-shaped fan of the compressor;
            wherein each of the fan blades has an "S" shape;
            the dual wheel-shaped fans of the compressor,
            wherein each of the dual wheel-shaped fans of the compressor consist of a main wheel-shaped fan and an auxiliary wheel-shaped fan bushed on the main wheel-shaped fan;
            wherein a plurality of driving key grooves or driving keys of the main wheel-shaped fans of the compressor are provided in a circle at an internal diameter of a respective wheel hub of each main wheel-shaped fan of the compressor;
            wherein a respective wheel hub of each auxiliary wheel-shaped fan is bushed outside of the wheel hub of a corresponding main wheel-shaped fan;
            wherein swinging key grooves or swinging keys are positioned on each auxiliary wheel-shaped fan of the compressor and provided in a circle at an internal diameter of the wheel hub of the auxiliary wheel-shaped fan, to rotationally couple each auxiliary wheel-shaped fan of the compressor to the wheel hub of the corresponding main wheel-shaped fan;
            wherein a front part of a first main wheel-shaped fan of the compressor is configured to be contacted by air entering the engine; and the first main wheel-shaped fan of the compressor is butted with a first supporting disk of the compressor by a butting ring, and the butting ring is connected with the first main wheel-shaped fan of the compressor by a bolt;
            wherein a starting gear ring is provided at a radially outward side of the rim of one of the dual wheel-shaped fans of the compressor at a rear end of the compressor;
            wherein a rolling ratchet is provided as a unidirectional rotating ratchet structure at a radially inward side of the rim of a rear most dual wheel-shaped fan of the compressor;
        the single wheel-shaped fans of the turbine further comprising
            a plurality of driving key grooves or driving keys provided in a circle on an internal diameter of each single wheel-shaped fan of the turbine;
            wherein each fan blade of each single wheel-shaped fan of the turbine is hollow and wherein an air flow channel extends through a respective rim, a respective wheel hub and respective fan blade of each single wheel-shaped fan of the turbine;
            wherein a round ball bearing and a slide way are provided in a circle respectively at two lateral sides of a radially outward side of the rim;
    the driving component comprising a plurality of driving axle sleeves,
        wherein the plurality of driving axle sleeves are sleeved together around an axis, and a space is provided between adjacent driving axle sleeves;
        wherein a plurality of penetrating holes are provided on a tube wall of each driving axle sleeve;
        wherein a guiding cone is provided in a central driving axle sleeve to guide the flow;
        wherein a respective single wheel-shaped fan of the turbine drives a respective main wheel-shaped fan of the compressor to rotate via a respective driving axle sleeve provided between the respective single wheel-shaped fan of the turbine and the respective main wheel-shaped fan of the compressor;
        wherein a plurality of circular driving keys or key grooves are provided at a first end of each driving axle sleeve, except for a radially outward most driving axle sleeve, for coupling the respective main wheel-shaped fan of the compressor to the driving axle sleeve; and a plurality of circular driving keys or key groove rings are provided at a second end of each driving axle sleeve for coupling the respective single wheel-shaped fan of the turbine to the driving axle sleeve;

wherein a rolling ratchet is provided at a first end of the radially outward most driving axle sleeve for coupling a rearward most main wheel-shaped fan of the compressor to the radially outward most driving axle sleeve;

the structural component comprising
a plurality of supporting disks,
a plurality of disk-fixing bolts,
a plurality of assembling bolt sets,
a middle casing and
a circular combustor,
a plurality of ball bearings and a slide way that support each single wheel-shaped fan of the turbine and each dual wheel-shaped fan of the compressor to rotate in respective supporting disks;

wherein the ball bearings and the slide way are provided at one side or two sides of each supporting disk at an internal diameter of each supporting disk;

wherein a plurality of round disk-fixing holes are provided in a circle in a radially inward side of each supporting disk;

wherein disk-fixing bolts fix two adjacent supporting disks together through the plurality of disk-fixing holes;

wherein a plurality of assembling holes are provided in a circle at a radially outward side of each supporting disk;

wherein the plurality of supporting disks comprise a first plurality of supporting disks of the single wheel-shaped fans of the turbine and a second plurality of supporting disks of the dual wheel-shaped fans of the compressor;

the plurality of assembling bolt sets consist of a respective bolt for fixing all supporting disks of the dual wheel-shaped fans of the compressor and all supporting disks of the single wheel-shaped fans of the turbine through respective assembling holes of the plurality of assembling holes and respective fastening components;

wherein the circular combustor is positioned in the middle casing and is connected to the supporting disk of the rearward most dual wheel-shaped fan of the compressor or the supporting disk of a forward most single wheel-shaped fan of the turbine; and the starting component comprising
a starting motor and
a starting gear train;
wherein the starting motor provides power for starting the engine;

wherein the starting gear train transmits the power of the starting motor to the starting gear ring of the rearward most dual wheel-shaped fan of the compressor.

2. The engine according to claim 1, wherein each dual wheel-shaped fan of the compressor, a respective single wheel-shape fan of the turbine and a respective driving axle sleeve form a group that is configured to rotate at a common speed and a common direction;

wherein the common direction of each group is opposite to the common direction of an adjacent group;

wherein the common speed of each group is different from the common speed of the adjacent group; and wherein two adjacent dual wheel-shaped fans of the compressor form a compressor working stage and two adjacent single wheel-shaped fans of the turbine form a turbine working stage;

wherein the fan blades of the main wheel-shaped fan of the compressor and the auxiliary wheel-shaped fan of the compressor of a respective dual wheel-shaped fan of the compressor are aligned.

3. The engine according to claim 1, wherein a circular funnel shaped external framework with a lattice structure of the compressor or the turbine comprises the supporting disks, the disk-fixing bolts and the assembling bolt sets;

wherein a plurality of groups of ball bearings in the slide ways of the plurality of supporting disks support all the dual wheel-shaped fans of the compressor and all the single wheel-shaped fans of the turbine to rotate around an axis in a forward direction or a reverse direction on the circular funnel shaped external framework;

wherein the plurality of driving axle sleeves penetrate through a hollow area of the circular combustor and insert into respective wheel hubs of the plurality of dual wheel-shaped fans of the compressor and the plurality of single wheel-shaped fans of the turbine, and are suspended by the respective dual wheel-shaped fans of the compressor and the respective single wheel-shaped fans of the turbine;

wherein a double-sleeved structure arranged in a middle section of the engine is formed by an external casing of the circular combustor and an engine casing; and wherein the compressor, the turbine and the double-sleeved structure are connected by the assembling bolt sets, forming an entire body of the engine.

4. The engine according to claim 1, wherein the plurality of single wheel-shaped fans of the turbine and the plurality of dual wheel-shaped fans of the compressor are cooled by flowing air such that cold air enters into the central driving axle sleeve and is divided by the guiding cone;

wherein the divided cold air first cools the wheel hubs of the plurality of dual wheel-shaped fans of the compressor by passing through the space between adjacent driving axle sleeves, cools the external casing of the circular combustor by passing through an area of the circular combustor, and converges into the rear end of the central driving axle sleeve to be discharged;

wherein the cold air flows into each air flow channel, and cools down the plurality of fan blades of the plurality of single wheel-shaped fans of the turbine, converges into the rear end of the central driving axle sleeve and is discharged through holes on a wall of the driving axle sleeve.

5. The engine according to claim 1, wherein the starting motor and the starting gear set only drive the rearward most dual wheel-shaped fan of the compressor to compress the air to the circular combustor;

wherein, when the rolling ratchet rotates unidirectionally and the radially outward most driving axle sleeve and the forward most single wheel-shaped fan of the turbine is not moved such that resistance to an air flow occurs; and wherein the engine is ignited and starts when air in the circular combustor accumulates.

\* \* \* \* \*